US012076844B2

(12) United States Patent
Carrier

(10) Patent No.: US 12,076,844 B2
(45) Date of Patent: Sep. 3, 2024

(54) GAS SPRING FASTENER DRIVING TOOL WITH FILL VALVE LOCATED IN AN END CAP

(71) Applicant: Kyocera Senco Industrial Tools, Inc., Cincinnati, OH (US)

(72) Inventor: Alexander L. Carrier, Columbus, OH (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 109 days.

(21) Appl. No.: 17/168,865

(22) Filed: Feb. 5, 2021

(65) Prior Publication Data

US 2021/0237242 A1 Aug. 5, 2021

Related U.S. Application Data

(60) Provisional application No. 62/970,376, filed on Feb. 5, 2020.

(51) Int. Cl.
*B25C 1/04* (2006.01)

(52) U.S. Cl.
CPC .............. *B25C 1/047* (2013.01); *B25C 1/045* (2013.01)

(58) Field of Classification Search
CPC ................................ B25C 1/045; B25C 1/047
See application file for complete search history.

(56) References Cited

U.S. PATENT DOCUMENTS 860,536 A 7/1907 Ellingham
2,814,041 A 11/1957 Haley
3,589,588 A 6/1971 Vasku
4,741,518 A 5/1988 Wallis
5,199,627 A 4/1993 Christensen
5,605,268 A 2/1997 Hayashi
(Continued)

FOREIGN PATENT DOCUMENTS

DE 8711784 8/1987
WO 2016174994 11/2016

OTHER PUBLICATIONS

BV Mini Bike Portable Hand pump—https://www.amazon.com/BV-Portable-Frame-120PSI-Pressure/dp/B07NZ8V8XP/ref=sr_1_4?crid=HS3GE509YTIS&keywords=100+psi+hand+pump&qid=1668550986&sprefix=100psi+hand%2Caps%2C192&sr=8-4 (Year: 2019).*
(Continued)

*Primary Examiner* — Anne Marie Antonucci
*Assistant Examiner* — Luis G Del Valle
(74) *Attorney, Agent, or Firm* — Frederick H. Gribbell; Russell F. Gribbell; William E. Crouse

(57) ABSTRACT

A gas-spring fastener driving tool has a working cylinder and a pressurized main storage chamber to hold the gases that will drive the cylinder's piston and driver combination. An end cap is placed on the upper (back) end of the pressure chamber, above the cylinder, with a set of seals and a set of fasteners; the fasteners can be removed by a user—one at a time—to safely release the stored gas pressure from the tool, for maintenance or repair of the interior parts. The end cap includes a fill valve positioned along the side of the working cylinder which allows 'refilling' gases to flow through passageways in the end cap, then into the working cylinder and pressure chamber, thereby bringing the tool up to its nominal working pressure. In some embodiments, the fill valve can also act as a pressure release valve.

11 Claims, 8 Drawing Sheets

(56) References Cited

U.S. PATENT DOCUMENTS

| | | | | |
|---|---|---|---|---|
| 7,494,036 | B2 | 2/2009 | Shima | |
| 2002/0125290 | A1* | 9/2002 | Robinson | B25C 1/008 227/8 |
| 2005/0001007 | A1* | 1/2005 | Butzen | B25C 1/047 227/130 |
| 2005/0217875 | A1 | 10/2005 | Forster | |
| 2006/0180631 | A1 | 2/2006 | Pedicini | |
| 2007/0007319 | A1 | 1/2007 | Simonelli | |
| 2008/0041914 | A1 | 2/2008 | Simonelli | |
| 2008/0067213 | A1 | 3/2008 | Shima | |
| 2008/0190988 | A1 | 8/2008 | Pedicini | |
| 2016/0229043 | A1 | 8/2016 | Wyler | |
| 2017/0297186 | A1* | 10/2017 | Meyer | B25C 1/04 |
| 2018/0036870 | A1 | 2/2018 | Komazaki | |
| 2018/0126527 | A1 | 5/2018 | Pomeroy | |
| 2018/0126530 | A1* | 5/2018 | Pomeroy | B25C 1/047 |
| 2018/0133877 | A1* | 5/2018 | Ueda | B25F 5/006 |
| 2018/0290279 | A1 | 10/2018 | Kobori | |
| 2019/0314968 | A1* | 10/2019 | Bailey | B25F 5/008 |
| 2019/0375084 | A1* | 12/2019 | Bierdeman | B25C 1/047 |
| 2020/0114500 | A1* | 4/2020 | Bierdeman | B25C 1/047 |
| 2021/0078149 | A1* | 3/2021 | Pedicini | B25C 1/047 |

OTHER PUBLICATIONS

Bogart #164G Hand Air Pump W/Gauge—https://robart.com/products/hand-air-pump-w-gauge?_ pos=1&_sid=427dedc92&_ss=r (Year: 2014).*

International Search Report, PCT/US2021/016853, 11 pages (Jun. 3, 2021).

* cited by examiner

GAS SPRING FASTENER DRIVING TOOL WITH FILL VALVE LOCATED IN AN END CAP

CROSS-REFERENCE TO RELATED APPLICATIONS

The present application claims priority to provisional patent application Ser. No. 62/970,376, titled "GAS SPRING FASTENER DRIVING TOOL WITH FILL VALVE LOCATED IN AN END CAP," filed on Feb. 5, 2020.

TECHNICAL FIELD

The technology disclosed herein relates generally to linear fastener driving tools and, more particularly, is directed to portable tools that drive staples, nails, or other linearly driven fasteners. At least one embodiment is disclosed as a 'main' pressurized storage chamber (the 'pressure chamber') that is used in a linear fastener driving tool, in which a working cylinder that becomes filled with compressed gas is used to quickly force a piston through a driving stroke movement through the working cylinder, while also driving a fastener into a workpiece. The working cylinder is in fluidic communication (via an end cap) with the pressure chamber which holds most of the compressed gas that is used to "fire" the piston. A fill valve is provided in a side portion of the end cap, which is fastened to the top portion of the pressure chamber. The end cap also covers the top region of the working cylinder.

The fill valve is designed to allow a user to safely refill (or bleed off) the pressurized gas into (or from) the combination pressure chamber and working cylinder. This fill valve is fastened into place near the very top portion of the end cap, but off to the side, so that it does not physically interfere with the working cylinder. The fill valve has an outer cover that can be easily removed by a human user, to quickly obtain access to that fill valve without disassembling any portion of the tool's outer casing. Once the fill valve cover is removed, the threads that held it in place become exposed. A human user can easily attach a refill adapter subassembly to those exposed threads (at the fill valve cover's former location). Once the refill adapter subassembly is attached, pressurized gas can be forced through a hose on the refill adapter subassembly from a gas pressure source, through the fill valve in the end cap, and then into an interior chamber that is formed by the end cap's structure. From that location, the pressurized gas can further travel into the pressure chamber and into the working cylinder.

The preferred fill valve is a Schrader valve, which also allows the human user to bleed out some of the pressurized gas, if desired. The 'output side' of the fill valve is in fluidic communication with a relatively small gas passageway that leads to the interior chamber that is in fluidic communication with the 'main' pressure chamber of the tool. That interior chamber is also in fluidic communication with another gas passageway (at the top) that leads to the displacement volume of the working cylinder. Therefore, when the tool is fully assembled, the main pressure chamber, the interior chamber, the 'top' gas passageway, and the working cylinder displacement volume are all in fluidic communication.

Another feature of the end cap is that it can be removed by a human user to obtain access to the interior parts of the working cylinder, if desired for repair, or for replacement of worn or broken parts. When in use with the tool, the removable end cap is attached to the outer wall of the pressure chamber by multiple threaded screws, and the shapes of the end cap with its large O-ring seal, allows the pressurized gas to begin to safely escape while those screws are being loosened. By the time the final screw is loosened to the point where the end cap can be physically removed from the pressure chamber outer wall, the majority of the pressurized gas will have been reduced to a safe pressure magnitude, so that the human user is not in danger of having any portions of the tool 'explode' in his face by a sudden unsafe discharge of that gas.

STATEMENT REGARDING FEDERALLY SPONSORED RESEARCH OR DEVELOPMENT

None.

BACKGROUND

Many conventional fastener driving tools use a piston to move a driver blade that forces a nail or staple into a target workpiece, as part of their operational cycle. These pistons are typically driven by compressed air, or in some cases, by combustion air. In a product line of pressurized air tools known as FUSION® that are sold by Senco, pressurized air is stored in a main storage chamber and that air is not vented to atmosphere, but instead is re-used multiple times, and can drive multiple driving strokes (including operational cycle counts in the thousands, per charge of pressurized air).

An early air spring fastener driving tool is disclosed in U.S. Pat. No. 4,215,808, to Sollberger. The Sollberger patent used a rack and pinion-type gear to "jack" the piston back to its driving position. A separate motor was to be attached to a belt that was worn by the user; a separate flexible mechanical cable was used to take the motor's mechanical output to the driving tool pinion gear, through a drive train.

Another air spring fastener driving tool is disclosed in U.S. Pat. No. 5,720,423, to Kondo. This Kondo patent used a separate air replenishing supply tank with an air replenishing piston to refresh the pressurized air needed to drive a piston that in turn drove a fastener into an object.

One of the Senco FUSION nailer tools known in the prior art is generally designated by the reference numeral 5 on FIG. 5. As noted above, this tool is sold by Kyocera Senco Industrial Tools, Inc. under the trademark FUSION. This is the original embodiment of the FUSION tool, and the more recent versions do not look exactly like what is depicted on FIG. 1; however, the newer versions of the FUSION tool include the same basic parts that work on the same basic principles.

The nailer tool 5 includes a pressurized chamber portion 6, an exit end (where the nails are shot) 7, a fastener magazine portion 8, and a hand-operated trigger 9. This is a partial cutaway view, so many of the internal components are visible. This tool has no fill valve.

Another air spring fastener driving tool is disclosed in published patent application No. US2006/0180631, by Pedicini, which uses a rack and pinion to move the piston back to its driving position. The rack and the pinion gear are decoupled during the drive stroke, and a sensor is used to detect this decoupling. The Pedicini tool is disclosed as having a "release valve" to replenish the air that is lost between nail drives.

This Pedicini disclosure places the air refill valve at the very back (or "top") of the working cylinder that drives the blade that shoots the nail. The actual physical structure of such a refill valve is not illustrated in the drawings of Pedicini, however, it clearly shows the valve is to be placed in the center of the back (or top) portion of the working cylinder. Note that, in most nail driving guns, the orientation of the tool has the nail outputting portion of the tool aimed toward the bottom, so that the nail is being shot in a downward, more or less vertical direction. Therefore, the "top" of the tool is essentially the same thing as the back or rear portion of the working cylinder, as illustrated in Pedicini FIG. 1.

Kyocera Senco Industrial Tools, Inc. ("Senco") sells a product line of automatic power tools referred to as nailers, including tools that combine the power and the utility of a pneumatic tool with the convenience of a cordless tool. One primary feature of such tools is that they use pressurized air to drive a piston that shoots the nail. In some Senco tools, that pressurized air is re-used, over and over, so there is no need for any compressed air hose, or for a combustion chamber that would require fuel.

Although Senco "air tools" are quite reliable and typically can endure thousands of shooting cycles without any significant maintenance, they do have wear characteristics for certain components. For example, after thousands of operations, the gas pressure inside the pressure chamber can slowly leak down to a pressure level that will need to be increased, or the tool will begin to fail to drive the fasteners successfully into their target workpiece. When that occurs, additional pressurized gas should be added into the pressure chamber. Moreover, if an "air tool" undergoes a mechanical failure (such as a jam), then the tool will need to be disassembled—that requires the pressurized gas to be bled off from the pressure chamber.

In the past, a Senco "air tool" that needed to be replenished with pressurized gas had to be sent to a Senco regional service center. The procedure to refill the tool with additional pressurized gas was not one that a normal user could perform. Special fixtures were required, and furthermore, this type of tool can cause an injury if the user ignores warnings and chooses to improperly service the pressure chamber. The gas pressure is still quite high, even if it has been reduced to an ineffective pressure level for driving nails; it could still injure someone if they tried to "open" the tool without the special fixtures.

Various types of "air tools" have been manufactured and sold over the years that use external air fittings that are connected by hoses to sources of compressed air to provide the power necessary to drive the piston of the fastener driving tool. In many of those "air tool" designs, the compressed air attachment points were fittings that were external to the air tool's overall shape and thereby increased the dimensions. This may not have been much of a disadvantage in air tools that have long air hoses connected to the tool for their normal operations, because the air hoses themselves were always going to be in the way of any movements by the human user of that air tool. However, in the line of tools sold by Senco known as FUSION™, this type of "air tool" has no external hoses or fittings, and therefore, a refill valve mechanism that extended outward from the tool would truly be somewhat of an impediment for the movements of the tool when handled by a user. Therefore, care should be taken when providing a gas refill valve mechanism, so that the tool does not become significantly larger in size and potentially awkward for handling by the user.

In some ways, the FUSION type of "gas-spring tool" has matured to a certain extent, and it has been determined by more than one manufacturer of such tools that a gas refill valve is desirable, mainly because these tools are quite reliable, and typically undergo thousands upon thousands of operating cycles. Only after many such thousands of cycles will some internal parts begin to wear, and only then would you see a typical slight gas leak out of the storage chamber and working cylinder combination, and in that circumstance, an additional charge of pressurized gas into those chambers would be desirable.

Another possibility is that the tool can become damaged, particularly when a fastener such as a nail becomes jammed while being driven by the driver blade, and in that situation, the tool may need to be opened to repair or replace the internal parts; or as a minimum, it needs to have the jammed nail removed from the driver track so that the tool can be continued to be used by a human operator. There are newer patent applications that disclose use of refill valves that are also used as "release" valves so that the pressurized gas inside the working cylinder and/or pressurized storage chamber can be discharged through such a release valve, and thereby make it safe to open the tool for repair, when that action may become necessary.

One example of this type of patent disclosure is a published patent application Number US 2016/0229043, by Wyler, owned by Milwaukee Electric Tool Corporation. This Wyler published application discloses a fill valve 34 that is illustrated in FIG. 2. The fill valve is mounted to a square footpad metal base (or "footer") that protrudes from the side of the cylindrical pressure chamber, about half-way between the guide body and the top of the pressure chamber. The placement of the fill valve 34 is important, because it is contained within a hollow space of the tool's handle, and in that manner the fill valve is not in the way of any hand movements of the human operator when using the tool. On the other hand, the fact that the fill valve is inside the tool's handle means that the casing of the tool must be at least partially disassembled before access to the fill valve is possible.

Another gas spring fastener driving tool with a fill valve is disclosed in published application number US 2018/0036870, by Komazaki, owned by Hitachi Koki Company, Ltd. In Komazaki, the fill valve is referred to as an "intake valve" at reference numeral 260, and it is positioned at the very top of the pneumatic chamber, much like that disclosed in Pedicini, discussed above. Moreover, the Komazaki intake valve is just that: it can be used only for placing additional pressurized gas into the pneumatic chamber, because it is a one-way check valve, and even has some type of switch lever to open the air passageway, or to keep it closed. If pressurized gas is to be released from this tool, then a separate "relief" valve 360 is added to the top of the tool, as illustrated in FIG. 10.

Yet another gas spring fastener driving tool with a fill valve is disclosed in published application number US 2018/0290279, by Kobori, owned by Hitachi Koki Company Ltd. This published application illustrates a "filling valve" at reference numeral 71 on FIG. 7, and is mounted to a bottom wall of the pressurized gas chamber. This filling valve 71 is also a single-direction gas valve, because the same figure shows a second "relief valve" 81 that is to be operated to discharge the gas within the compression chamber. Both of these valves are mounted on the bottom wall of the main storage pressure chamber.

SUMMARY

Accordingly, it is an advantage of the present technology disclosed herein to provide a fastener driving tool that operates on a gas spring principle, in which the pressure chamber includes a refill valve subassembly positioned near the top of the tool.

It is another advantage of the present technology to provide a fastener driving tool that operates on a gas spring principle and provides a refill valve subassembly that is permanently mounted to an end cap that itself is fastened to a main pressurized storage chamber, and provides a refill valve subassembly that is permanently mounted to an end cap that itself is fastened to a main pressurized storage chamber, using a set of fasteners that can be released in a controlled manner so as to allow the pressurized gas inside the main storage chamber to be safely released before obtaining access to the interior portion of the working cylinder of the tool.

It is a further advantage of the present technology to provide a fastener driving tool that operates on a gas spring principle, in which the tool includes an end cap that is fastened to a main pressurized storage chamber using a set of fasteners that can be loosened in a controlled manner so as to release the internal gas pressure in a controlled manner that is safe for a normal human user without special fixtures, and thereby enabling that user to access the internal portions of the tool for repair or for replacement of worn parts, for example.

It is yet another advantage of the present technology to provide a fastener driving tool that operates on a gas spring principle, in which the tool includes a refill valve subassembly that is positioned alongside of the working cylinder and within an end cap that covers a distal end of the working cylinder, and in which the refill valve has a connecting passageway to an interior chamber of the end cap that is in fluidic communication with a main pressurized storage chamber and also is in fluidic communication with a displacement volume of the working cylinder.

It is a yet further advantage of the present technology to provide a fastener driving tool that operates on a gas spring principle, in which the tool includes a refill valve subassembly that is positioned in an end cap near the top of the tool, and wherein the refill valve is covered by a valve cover that is easily removable by a human operator to obtain quick access to the refill valve, without having to disassemble any portion of the enclosure or housing of the tool.

It is still a further advantage of the present technology to provide a fastener driving tool that operates on a gas spring principle, in which the tool includes a refill valve subassembly in which the refill valve can act both as a "fill valve" and as a "release valve," so that the pressurized gas within the main storage chamber and within the end cap interior chamber and the displacement volume of the working cylinder can be easily reduced in pressure, for example, after a filling operation has occurred, in which that filling operation has somewhat over pressurized the interior portions of the tool, including the pressurized gas chamber.

It is still a further advantage of the present technology to provide a fastener driving tool that operates on a gas spring principle, in which the tool includes a refill valve subassembly that is able to receive a relatively quick connect and disconnect refill adapter subassembly and nozzle.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a fastener driving tool is provided, which comprises: a working cylinder that includes a movable piston, the cylinder including a variable displacement volume on a first side of the piston, and the cylinder including a variable venting volume on a second, opposite side of the piston; a storage chamber; an end cap that is attached to at least one of the cylinder and the storage chamber near an end portion of the fastener driving tool, the end cap including at least one first gas passageway that is in fluidic communication with the cylinder and with the storage chamber; a movable driver that is in mechanical communication with the piston; a guide body that guides movements of the driver; and a fill valve that is mounted at a side portion of the end cap, the end cap including a second gas passageway that travels between an inner end of the fill valve and the at least one first gas passageway of the end cap; wherein: the variable displacement volume of the cylinder, the storage chamber, and the at least one first gas passageway of the end cap all contain pressurized gases when the fastener driving tool is in use; and the pressurized gases are not vented to atmosphere after a drive stroke, but instead the pressurized gases are re-used for a plurality of operating cycles.

In accordance with another aspect, a method for filling pressurized gas in a fastener driving tool is provided, in which the method comprises the following steps: (a) providing a fastener driving tool that includes: a working cylinder that includes a movable piston, the cylinder including a variable displacement volume on a first side of the piston, and the cylinder including a variable venting volume on a second, opposite side of the piston; a storage chamber; an end cap that is attached to at least one of the cylinder and the storage chamber near an end portion of the fastener driving tool, the end cap including at least one first gas passageway that is in fluidic communication with the cylinder and with the storage chamber; a movable driver that is in mechanical communication with the piston; a guide body that guides movements of the driver; and a fill valve that is mounted at a side portion of the end cap, the end cap including a second gas passageway that travels between an inner end of the fill valve and the at least one first gas passageway of the end cap; (b) attaching a pressurized gas source to an outer end of the fill valve; and (c) pumping pressurized gas through the fill valve, from the pressurized gas source, and thereby filling the storage chamber with additional pressurized gas.

In accordance with yet another aspect, a fastener driving tool is provided, which comprises: means for storing a pressurized gas; valve means for introducing additional pressurized gas into the means for storing a pressurized gas; means for propelling a reciprocating element in a drive stroke using the pressurized gas, wherein the pressurized gas is not vented to atmosphere after the drive stroke, but instead the pressurized gas is re-used for a plurality of operating cycles of the reciprocating element; and means for propelling the reciprocating element in a return stroke, to complete an operating cycle.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
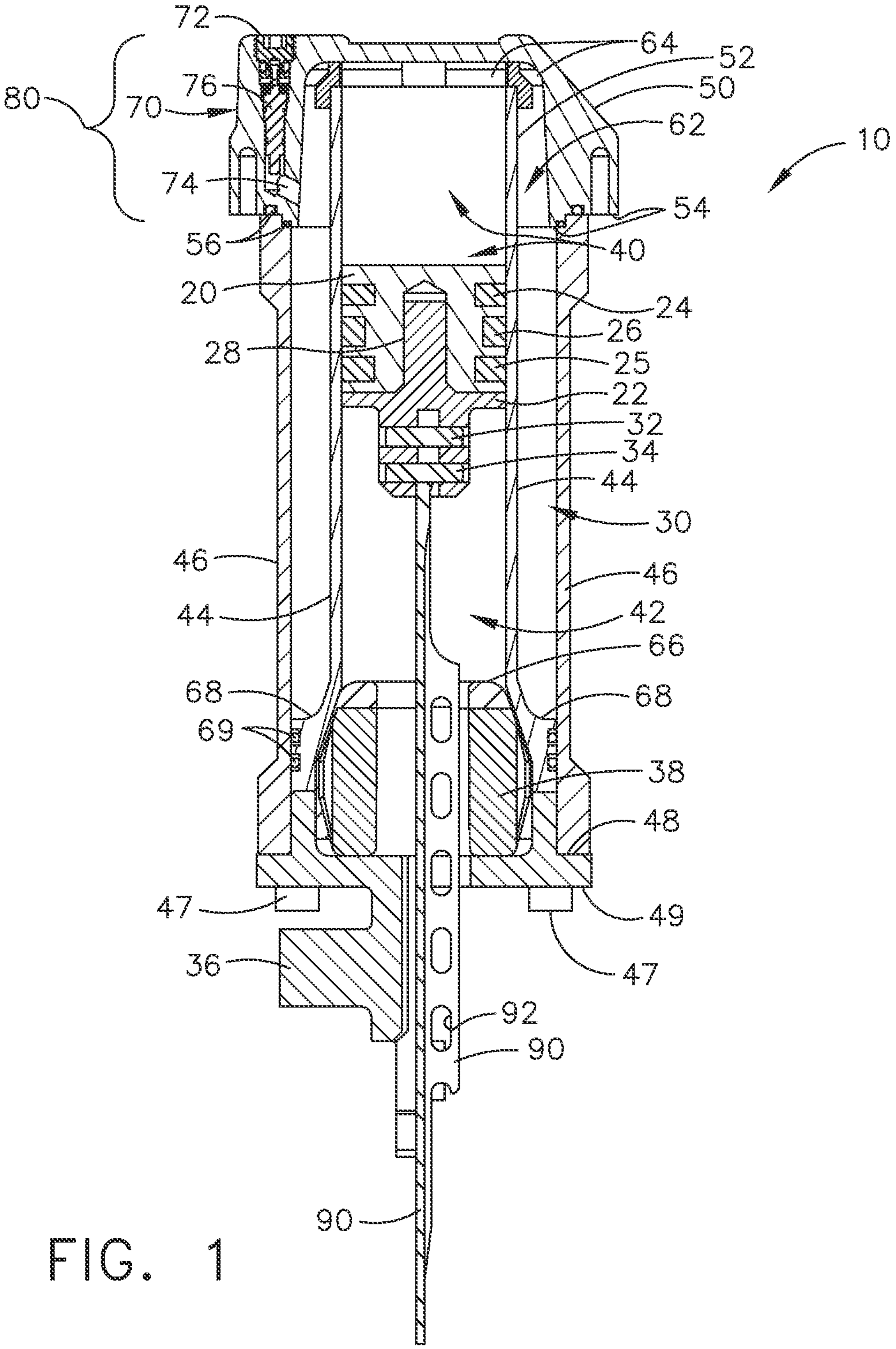
FIG. 1 is an elevational view in cross-section of the entire working cylinder subassembly of a gas-spring fastener driving tool, taken along the section line 1-1 of FIG. 3, in which the working cylinder subassembly and the gas spring tool are constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to FIG. 1, a new embodiment of a FUSION-type tool is illustrated. The pressurized chamber subassembly is shown from the side in a cross-section view, and is generally designated by the reference numeral 10. The outer sleeve or wall of the pressure chamber is illustrated at 46, and the top portion of the pressure chamber is covered by an end cap subassembly, designated by the reference numeral 80. There is a similar cross-section view illustrated in FIG. 4 that shows fewer components, and both of these cross-section views are taken along the section line 1-1 on FIG. 3.

Referring now to FIG. 1, a movable piston is illustrated as being within a working cylinder, in which the outer cylindrical wall of the working cylinder is designated at 44. In this embodiment, the piston is provided as two separate parts, in which the top portion of the piston at 20 is made of a non-metallic material, such as Delrin, and the bottom portion of the piston at 22 is made of a metallic material, such as aluminum. In this embodiment the two piston halves are threaded together along threads 28 into a single reciprocating subassembly, which are external threads for the bottom of the piston (the aluminum portion), and are internal threads for the upper non-metallic portion 20. It will be understood that the exact shape and construction of such a reciprocating piston can be quite different while still remaining within the principles of this technology being disclosed herein.

The upper piston portion 20 includes some outer channels in its cylindrical outer surface so that an annular piece of foam containing lubricant can be positioned within that upper channel, in this case the upper foam at 24. The next groove in the piston contains a quad-seal at 26. The next lower groove in the outer portion of the piston contains another annular piece of foam at 25, which can either contain lubricant or not have lubricant. The choice of with, or without, lubricant for the lower foam piece 25 is up to the system designer of the entire tool.

Figure 4:
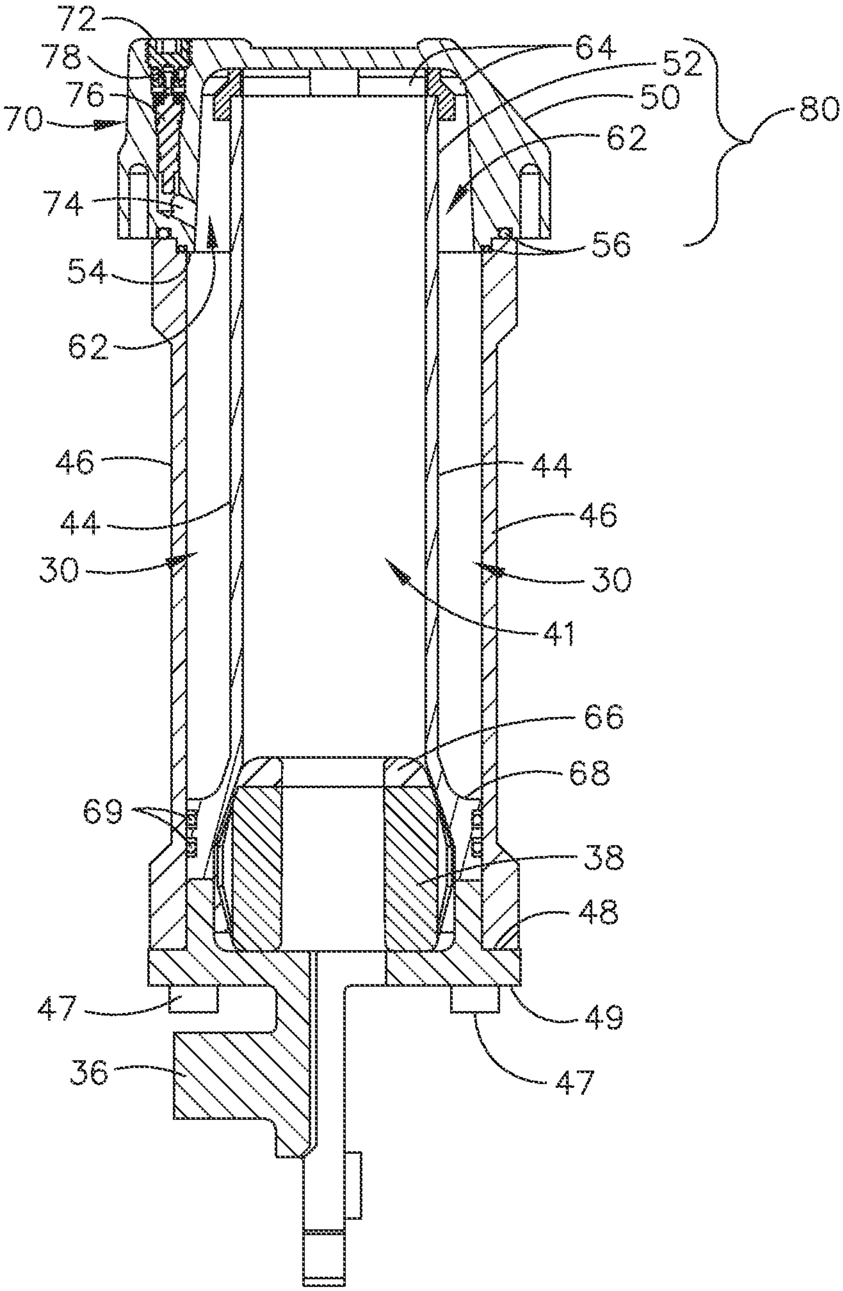
FIG. 4 is another cross-section elevational view similar to FIG. 1, but with no piston or driver included in this view.

On FIG. 1, the piston subassembly is illustrated at a mid-position, and it can reciprocatingly move farther up (in this view) towards the end cap 80, or can move farther down (in this view) toward a piston stop 38. (The piston stop is also referred to as a bumper.) The variable volume "above" the piston in this view (at reference numeral 40) is referred to as the "displacement volume" which is pressurized, whereas the volume "below" the piston in this view (at reference numeral 42) is a variable volume referred to as "venting chamber" volume, which is open to atmosphere at a lower portion of the tool. As is understood in this area of technology, as the piston moves up and down in a reciprocating fashion, the displacement volume decreases and increases with each up and down stroke, and the venting chamber volume below the piston correspondingly also increases and decreases as the piston moves up and down. The overall internal working cylinder volume is referred to by the reference numeral 41 on FIG. 4, which is essentially a combination of the displacement volume and the variable venting chamber volume, and further includes the volume that the piston would normally take. As can be seen in FIG. 4, there is no piston, so the working cylinder open volume at 41 is completely empty, which is for illustrative purposes only. As can be understood, in the illustrated design, this overall internal working volume 41 does not vary in size, since the cylinder walls are rigid.

The bottom piston half 22 is attached to a driver 90 by use of a pair of pins 32 and 34 that are inserted through small channels, as can be seen in FIG. 1, that also extend through openings in the driver. The driver itself goes through an opening of the piston stop 38, and further into a guide body 36, which guides the driver in its movements for driving a fastener. The driver 90 is also referred to in many other patents as a hammer or as a blade. In the illustrated embodiment, the driver 90 includes a series of openings at 92, which are used for catching against a latch (not shown in this embodiment) that can inhibit the downward movement of the driver at times in which it is inappropriate for the driver to be moving in a downward direction. This aspect of the driver and the latch will not be further described for this embodiment—see the description in connection with FIG. 6.

There is a main storage chamber that is pressurized with gas, generally designated by the reference numeral 30, which is also referred to herein as the "pressure chamber." In this embodiment, the pressure chamber 30 comprises an annular space that partially surrounds the working cylinder wall 44, and the pressurized space at 30 is essentially between the outer surface of the working cylinder wall 44 and the inner surface of the pressure chamber outer wall 46. In a preferred mode of the invention, the pressure vessel may be pressurized at about 100 PSIG to 120 PSIG.

The main purpose of the pressure chamber is to hold additional pressurized gas for use in driving the piston subassembly in its downward or "driving stroke" direction, in which it will be driving a fastener such as a nail or a staple. This additional pressurized gas in the pressure chamber allows for a sufficient force to be imparted against the upper surface of the top portion of the piston at 20, while forcing a nail or staple into a target surface, such as a piece of wood. This storage volume 30 that represents the pressure chamber allows a lower overall gas pressure to be used in the overall workings of this fastener driving tool to provide a gas spring effect without requiring an extremely high pressure that would otherwise be required in the displacement volume above the piston within the working cylinder, if there was no pressure chamber to hold additional pressurized gas.

Figure 2:
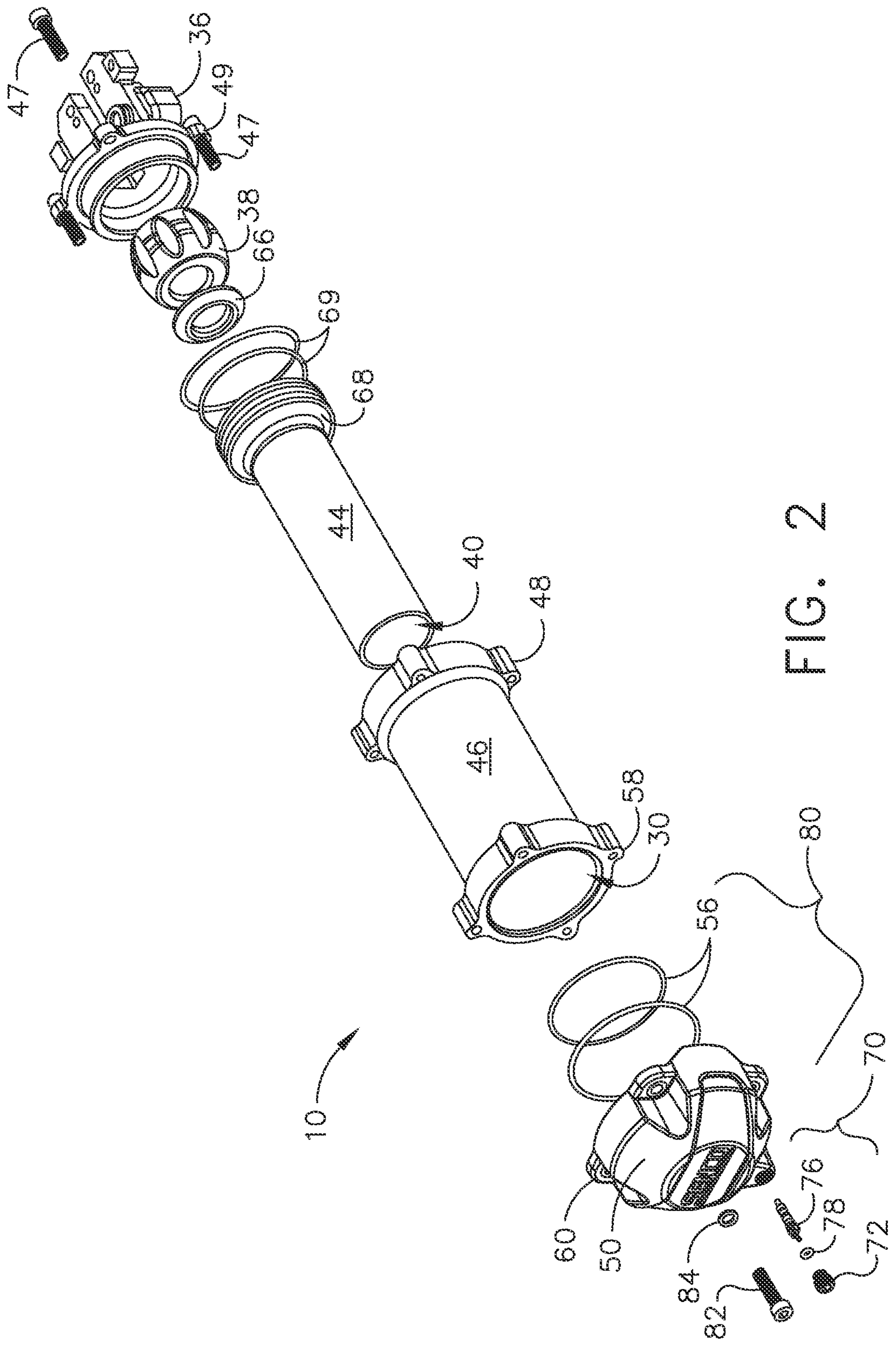
FIG. 2 is an isometric exploded view, showing the parts of the entire working cylinder subassembly of FIG. 1.

Referring now to the exploded view of FIG. 2, The end cap subassembly 80 includes a metal end cap 50, which is fastened to the uppermost portion of the outer walls of the pressure chamber by fasteners 82. It can be seen that there are several fasteners that hold either the end cap 50 or the guide body 36 to the pressure chamber outer wall, at a pair of flanges 48 and 58. The flanges have extensions (or bosses) with openings in them for holding the fasteners, which in this embodiment are a set of screws or bolts. For example, the flange 58 has openings for holding the screws 82 that hold the end cap 50 in place; similarly, the flange 48 has openings for holding the screws 47 that hold the guide body in place. On the end cap portion, there are washers 84 that are mated with the screws 82, that are helpful for holding the end cap in place, as well as maintaining the internal gas pressure, without leakage.

The end cap 50 has a mating flange 60 that mounts against the flange 58 that is part of the pressure chamber outer wall 46. Similarly, the guide body 36 has a mating flange 49 that is to be mounted against the flange 48 that is on the opposite side of the pressure chamber. The end cap 50 also has a circular bottom surface at 54 that mates to the similar circular outer surface of the pressure chamber 46, all in the same area as the flanges 54 and 58; the details of the structures can be seen on FIG. 1 and on FIG. 4.

As noted above, the portion of the tool that is referred to by the reference numeral 10 is the entire working cylinder subassembly, which is under pressure once a pressurized gas is introduced into the system. With that in mind, there are additional seals to help hold that pressure within the combination of the pressure chamber 30 and the other portions that contain pressurized gas, including the displacement volume 40 and other passageways in the end cap 50. On the end cap subassembly 80 of this first embodiment, there are two seals (which are O-rings) at the reference numeral 56, and on the opposite end there are seals (which are O-rings) at the reference numeral 69. The exact placement of these O-rings can be seen in the cross-section view of FIG. 1.

Also viewable in FIG. 1 is a washer 66 that sits atop the piston stop 38, and provides some extra cushioning effect with regard to the impact of the metal portion of the piston 22. In addition, the cylinder sleeve wall is thickened and becomes curved into a larger outer diameter at a portion 68, which extends against the inner surface of the pressure chamber outer wall; at this juncture between those two structures is where the O-rings 69 are positioned—this again is viewable in FIG. 1. Note that the precise number and placement of such seals are up to the tool's designer and, for example, a single seal 56 can suffice.

Further details of the end cap 50 are viewable on FIG. 1. A portion of the working cylinder wall 44 extends farther above the pressure chamber and becomes essentially surrounded by the end cap. This portion is designated by the reference numeral 52 on FIG. 1; however, it should be noted that the structure at 52 is merely a portion of the overall cylinder outer wall 44, and has the same dimensions with regard to inner and outer diameters as the rest of the working cylinder (until reaching the portion at 68 where the cylinder wall becomes thicker and larger in diameter).

When the tool is assembled, there is a set of passageways within the end cap that allow pressurized gas to flow between the pressure chamber 30 and the displacement volume 40. There is an outer gas passageway at the reference numeral 62 and an inner gas passageway at the reference numeral 64, and both are within the structure of the end cap 50. The outer gas passageway 62 allows pressurized gas to flow between the pressure chamber 30 and the inner gas chamber passageway 64; the inner gas passageway 64 allows pressurized gas to flow between the outer gas passageway 62 and the displacement volume 40 of the working cylinder. In the illustrated embodiment, these gas passageways 62 and 64 are in fluidic communication with both the displacement volume 40 and the pressure chamber 30 at all times. It should be noted that the gas passageways 62 and 64 can be referred to herein, either singly or combined together, as "at least one first gas passageway" which is/are in fluidic communication with the "cylinder" (e.g., the displacement volume 40) and/or with the "storage chamber" (e.g., the pressure chamber 30).

The overall shape and structure of the end cap and its mating flange surfaces to the top of the pressure chamber are designed so that a human user can safely remove the end cap merely by loosening the screws 82, even though the working cylinder and the pressure chamber still contain a relatively high gas pressure therewithin. As a human user begins to remove the screws 82, the pressurized gas will safely begin to escape around the edges of the bottom surfaces 54 of the end cap, and that gas is essentially released at a controlled rate because of two main factors: in the first place there are the O-ring seals 56 (or a single seal), and in the second place it will take some time to remove the screws to even begin to allow gas to start escaping around the perimeter of the outer flange surfaces 58 and 60. As the screws are loosened, the pressurized gas will eventually escape, and by the time the final screw is totally removed, the internal gas pressure will be at a safe magnitude, and the end cap can then safely be entirely removed from the top of the pressure chamber 30, thereby exposing the interior of the working cylinder so that the piston and other internal components can be replaced, as desired.

Figure 3:
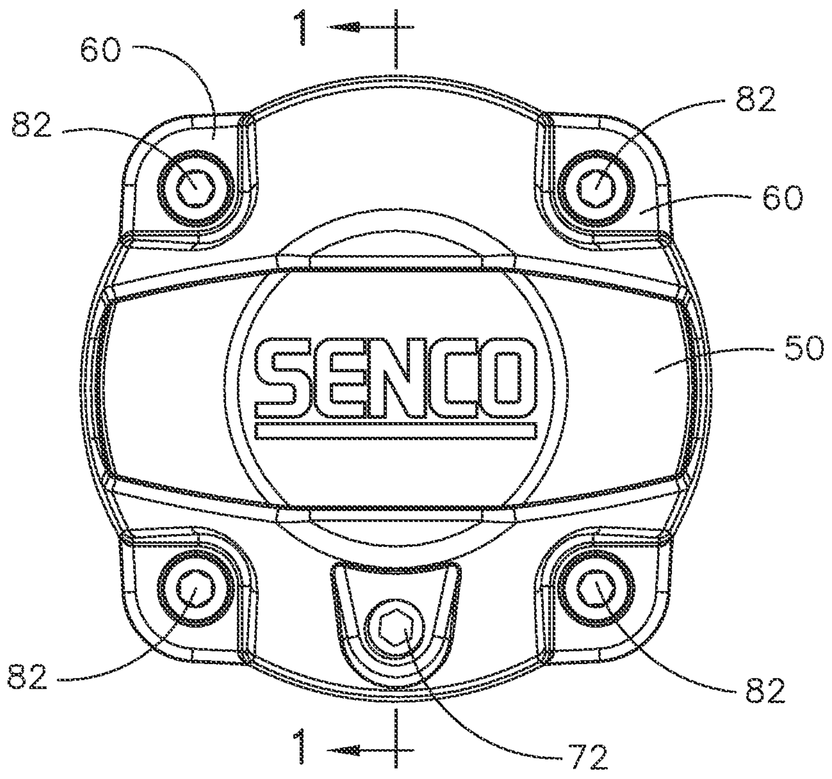
FIG. 3 is a top plan view of the end cap that is the upper portion of the working cylinder subassembly of FIG. 1.

Referring now to FIG. 3, the top portion of the end cap 50 is seen, in which the four fasteners 82 are seated down against the flange surfaces 60 of the end cap. These screws are placed in an area where there is sufficient ease of access for removal.

The end cap subassembly 80 includes rather more structure than merely the gas passageways 62 and 64, and the flanges and the screws for holding the end cap to the pressure chamber. In addition to what has been discussed above, there also is a fill valve subassembly 70 (see FIG. 2) that includes a fill valve at 76. In the illustrated embodiment, the fill valve 76 is a Schrader valve. In the illustrated embodiment, the fill valve 76 is threaded into a portion of the end cap along the outer side of the outer gas passageway 62. In this manner, the fill valve only adds a minor amount of extra "territory" or footprint to the end cap itself, and at the same time, the fill valve remains completely outside of the moving parts of the working cylinder. As can be seen in the top view of FIG. 3, this fill valve 76 really does not add any extra size to the outer surfaces of the tool, except (as can be seen in FIG. 4) the fill valve has a higher surface along the top of that side of the end cap, as compared to the opposite side of the end cap outer dimension.

After the fill valve 76 has been assembled into the end cap, then a small O-ring 78 is installed to a threaded valve cover 72, and they are installed above the fill valve 76. In this manner, the valve cover 72 acts as a dust and debris cover to prevent physical damage to the fill valve, and with the O-ring 78 acting as a seal, this helps to prevent any gas pressure from seeping out through the fill valve back into the atmosphere from the interior portions of the pressurized chamber and working cylinder.

As can be seen on FIGS. 1 and 4, there is a gas passageway 74 that extends from the bottom of the fill valve into the outer gas passageway 62 of the end cap. Another way of describing the gas passageway 74 is that it travels between an inner end of the fill valve and the outer gas passageway 62 of the end cap 50. Note that the fill valve exhibits both an inner end and an outer end; the inner end is in fluidic communication with the gas passageway 74, and the outer end is typically covered by the valve cover 72 during normal use of the tool. It should be noted that the gas passageway 74 also can be referred to herein as "a second gas passageway" that travels between an "inner end of the fill valve" and "at least one first gas passageway" of the end cap 50.

It can be clearly seen from viewing FIGS. 1 and 4 that the side portion of the end cap where the fill valve 76 mounts is located at a position that is outside the boundaries of the working cylinder wall 44, and for that matter, its position is also outside the boundaries of the pressure chamber outer wall 46 and the gas passageways 62 of the end cap. Furthermore, the side portion of the end cap where the fill valve mounts is outside a boundary of an imaginary cylinder that extends through and beyond the working cylinder.

Since the outer passageway 62 is in fluidic communication with both the working cylinder displacement volume 40 and the pressurized chamber 30, then any additional pressurized gas introduced through the fill valve 76 will also end up in those important regions of the gas spring fastener driving tool.

In essence, if the tool has been disassembled by removing the end cap subassembly 80, which will de-pressurize the internal chambers, such as the pressure chamber 30 and the displacement volume 40, then after the tool has been repaired (or has otherwise had some worn parts replaced, for example, as preventative maintenance), then the tool must then be somehow re-pressurized. That of course is the main function of the fill valve subassembly 70, and that procedure includes a few additional parts that will be needed to create a refill "system." For example, there will need to be a source of pressurized gas, some type of hose, and some type of hose connector that will mate to the fill valve 76. Examples of those devices are illustrated on FIG. 6, which is discussed below.

In the first place, the fill valve cover 72 must be unscrewed, and in the illustrated embodiment, that cover 72 has a hexagonal head and can be removed by a standard hex wrench. Once that has been removed, access is now immediately available to the top of the fill valve 76. A "refill adapter subassembly" 200 will then be screwed onto the threads above the fill valve 76 where the threaded valve cover 72 was just removed.

Figure 7:
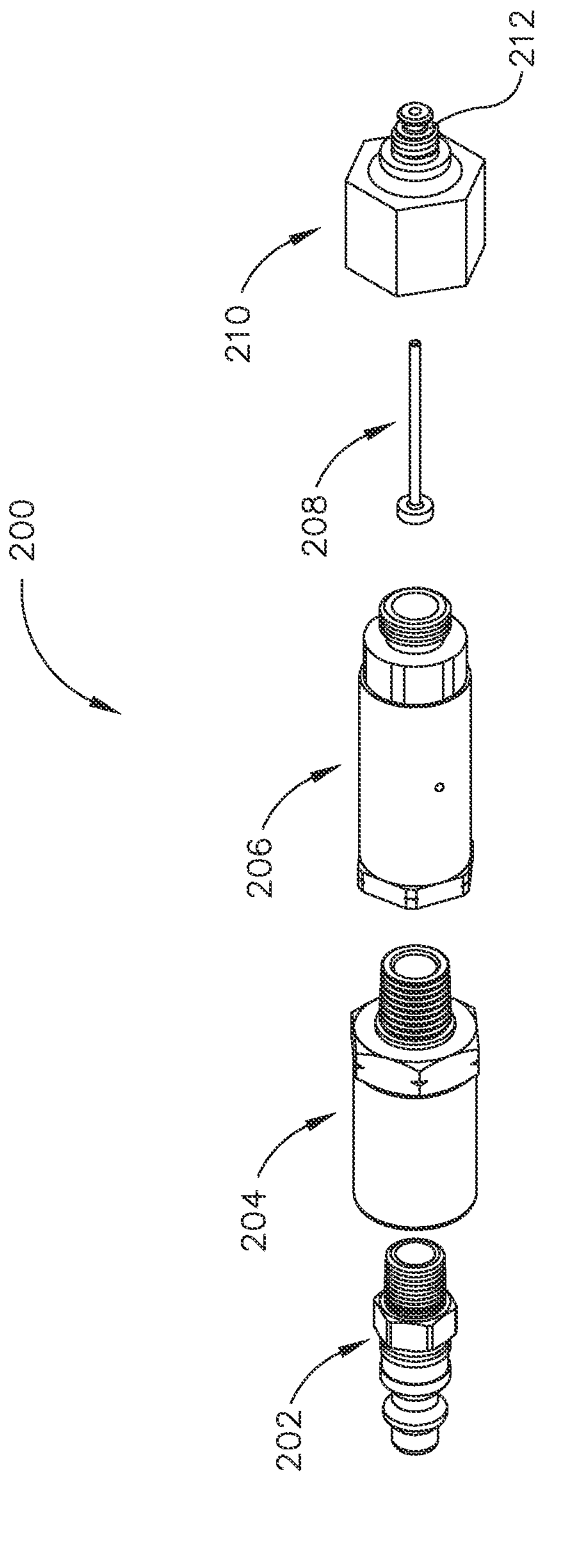
FIG. 7 is an isometric exploded view of a refill adapter subassembly that is to be used with the fill valve of the working cylinder subassembly of FIG. 1.
Figure 8:
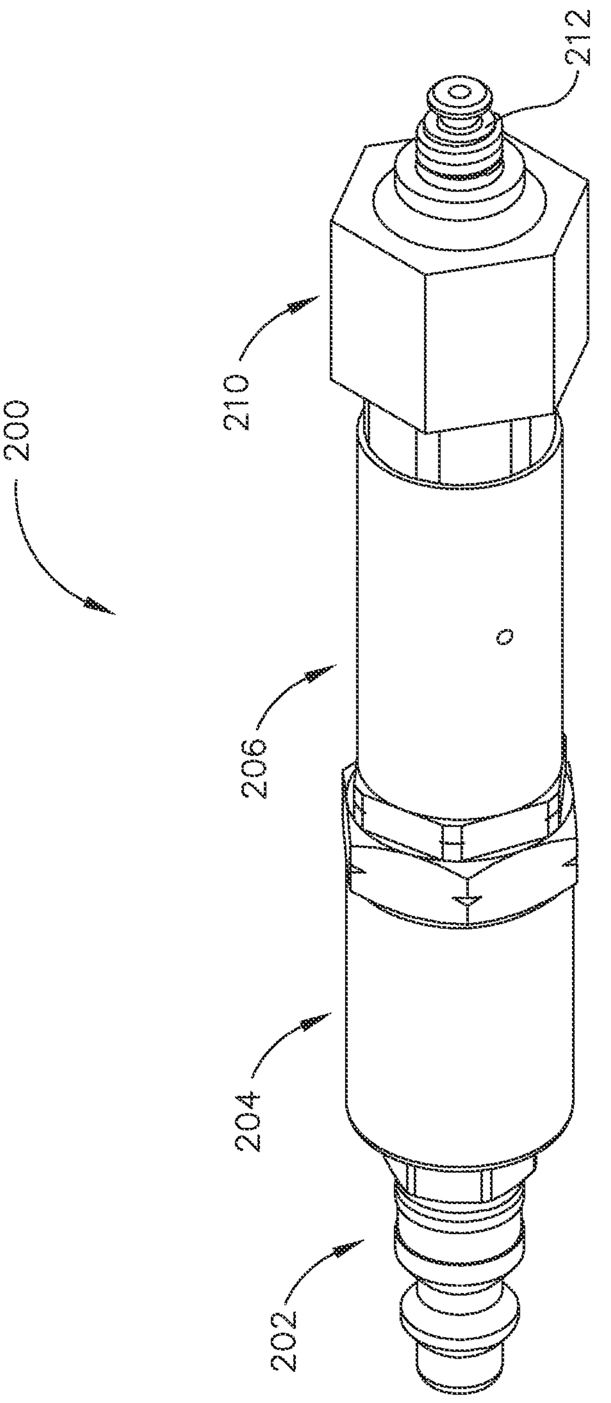
FIG. 8 is an isometric view of a refill adapter subassembly that is to be used with the fill valve of the working cylinder subassembly of FIG. 1.

Referring now to FIG. 8, the view shows a refill adapter subassembly 200. The refill adapter subassembly 200 has a fill valve fitting 210 on one end that attaches to the fill valve 76 on the tool. Inside the fill valve fitting 210 is a fill needle 208 (see FIG. 7) which is attached to a pressure regulator 206. The pressure regulator 206 is attached to a filter 204, which is attached to a hose fitting 202 at a distal end from the fill valve fitting 210. The hose fitting 202 is coupled to an air or gas source. These parts are temporarily coupled to the refill valve 76 when a user desires to add pressurized air (or other gas) into the pressurized chamber 41, and further details of this procedure are provided below.

Referring now to FIG. 7, the same components from FIG. 8 are illustrated in an exploded view, and are used only during a refill procedure. The fill valve fitting 210 is used only during a refill procedure, and it screws into the fill valve 76. (The fill valve cover 72 first must be unscrewed from the fill valve 76.) A nozzle 212 is then placed into and through the fill valve fitting 210. A blow gun or an air hose (not shown) would be coupled to the hose fitting 202, for use with an external gas pressure source. Once the tool's pressure chamber has reached an appropriate gas pressure, the refill adapter subassembly 200 can be removed, by unscrewing the fill valve fitting 210.

It should be noted that, if a standard Schrader valve is used as the fill valve 76, then pressurized gas may not only be introduced into the tool's inner pressurized chambers, but pressurized gas can also be removed from those chambers, if desired. This can be important if the human user puts an excessive amount of pressurized gas into the storage chamber 30 during a refill procedure. If that indeed happens, then the human user can take a pressure gauge and measure the internal pressure by accessing the top of the fill valve 76, and if that pressure is excessive, the user can easily press against the plunger of the Schrader valve to release some of that pressurized gas from the internal chambers of the tool. In this way, even though a Schrader valve is a one-way valve and acts like a check valve, it still is readily configurable to allow gas to move in the opposite direction to lower the internal pressure, as desired by the user. In other words, if a Schrader valve is used for the fill valve 76 (as discussed above), then that "fill valve" can also be used as a pressure release valve.

Figure 5:
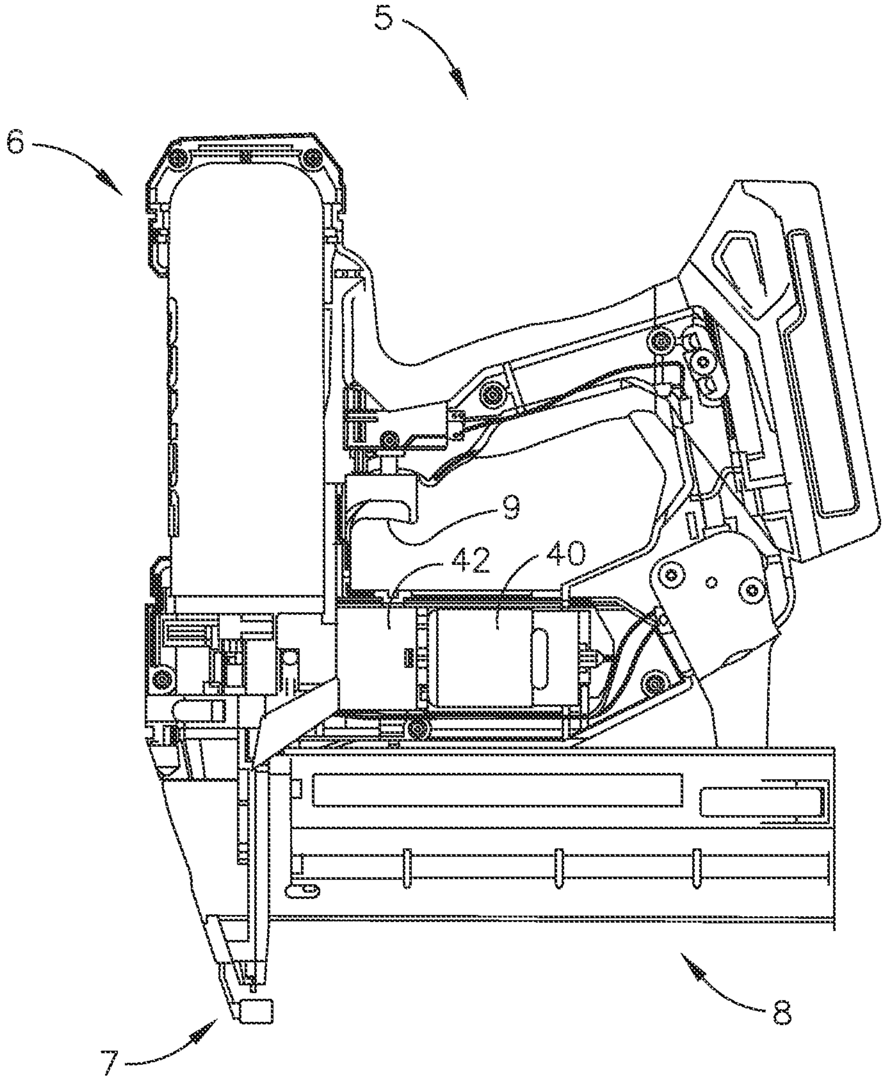
FIG. 5 is a side-elevational view of an earlier embodiment of a Senco gas-spring fastener driving tool known as a FUSION® nail driving tool.

Referring now to FIG. 5, an earlier embodiment of a Senco nailer tool is generally designated by the reference numeral 5. This tool is sold by Senco under the trademark FUSION. This is the original embodiment of the FUSION tool, and the more recent versions do not look exactly like what is depicted on FIG. 5. However, the newer versions of the FUSION tool include the same basic parts that work on the same basic principles, as appropriate for use in the present nailer tool described herein.

The nailer tool 5 includes a pressurized chamber portion 6, an exit end (where the nails are shot) 7, a fastener magazine portion 8, and a hand-operated trigger 9. This is a partial cutaway view, so many of the internal components are visible.

Figure 6:
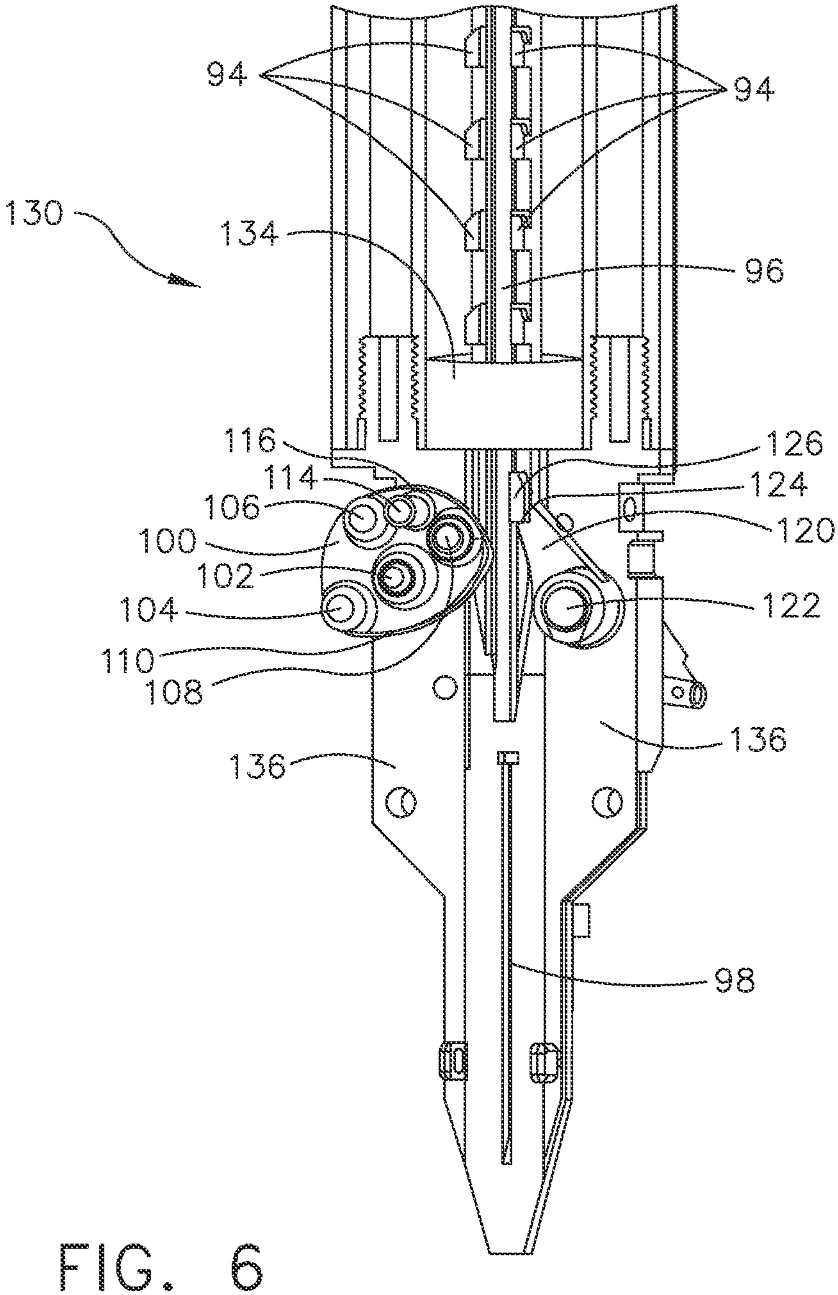
FIG. 6 is a front elevational view of an earlier embodiment of a Senco gas-spring fastener driving tool, illustrating the lifter and latch mechanisms, and an alternative embodiment of a driver.

Referring now to FIG. 6, an alternative embodiment fastener driving tool is depicted, showing a fastener driver portion 130 of an older Senco tool design. FIG. 6 illustrates the mechanisms that will actually drive a fastener into a solid object. This includes a driver 96, with driver teeth 94, a driver track 98 along a guide body 136, a rotary-to-linear lifter 100 subassembly, and a latch 120. The rotary-to-lifter 100 is also sometimes referred to herein simply as a "lifter." Driver 96 is rather elongated, and exhibits multiple protrusions, or "teeth," 94 that are positioned along the longitudinal surfaces of the driver. In the illustrated embodiment, these teeth 94 are spaced-apart not only in a transverse direction from the elongated centerline of driver 96, but they are also spaced-apart from one another along the outer longitudinal edges of the driver 96. It will be understood that the precise positions for the teeth 94 could be different from those illustrated for the driver 96 without departing from the principles of the present technology.

There is a cylinder base 134 that mainly separates the gas pressure portions of the fastener driver portion 130 from the mechanical portions of that driver portion. The venting of air from the cylinder's venting chamber passes through the cylinder base 134. The mechanical portions of FIG. 6 begin with a rotary-to-linear lifter 100 which was briefly mentioned above, along with a lifter drive shaft 102. Drive shaft 102 protrudes through the center portions of the fastener driver portion 130 and through the center of the lifter 100, and this shaft is used to rotate the lifter, as desired by the tool's control system.

Lifter 100 is not designed with an entirely circular outer perimeter, but instead is arcuate and portions of its perimeter exhibit an eccentric shape of a cam. A portion of the lifter's outer perimeter is mainly circular for about half of a circle (designated by the reference numeral 116), but the other half of the lifter's outer perimeter is more eccentric, which provides an elliptical surface that is designated by the reference numeral 110. The rotary-to-linear lifter 100 also includes three cylindrical protrusions (or "extensions") that will also be referred to herein as "pins." The first such pin ("pin 1") is designated 104, the second pin ("pin 2") is designated 106, while the third pin ("pin 3") is designated 108. Furthermore, there is a fourth cylindrical pin ("pin 4") that protrudes from the opposite side of the lifter 100, which fourth pin is designated 114.

It should be noted that FIG. 6 depicts a "back" side of the first three pins 104, 106, and 108, in which this view essentially shows a "boss portion" of those pins. These boss portions of the pins 104, 106, 108 are not entirely necessary for the proper functioning of the rotary-to-linear lifter 100, however, the boss portions are illustrated in the figures of this patent document for ease of description. (In other words, the surface of the lifter 100 could be perfectly smooth at those locations rather than exhibiting a "boss.") It should be understood that the "working side" of these three pins 104, 106, and 108 is on the opposite side of the lifter 100 in the view of FIG. 6. It should also be noted that pins 104, 106, 108, and 114 are illustrated as having circular cross-sectional shapes, which is desirable for this embodiment, although other cross-sectional shapes could instead be used without departing from the principles of the present technology, particularly for the fourth pin 114.

The latch 120 has a latch shaft 122 protruding therethrough, and this shaft rotates the latch 120 as determined by the tool's controller. Latch 120 includes a latch "catching surface" at 124.

When the rotary-to-linear lifter 100 and the latch 120 are in their respective positions at the end of a firing (driving) stroke (not shown on FIG. 6), the latch 120 is rotated so that its latching surface 124 is moved to a location that will not interfere with the teeth 94 of the driver 96. This is necessary so that the driver 96 can make a linear stroke from its top-most position to its bottom-most position. However, the latch 120 will later be slightly rotated by the latch shaft 122

(which is spring-loaded) so that its catching surface 124 will be able to interfere with the teeth 94.

After the fastener driving tool has been used to drive a fastener, the tool now must cause the driver 96 to be "lifted" back to its top-most position for a new firing (driving) stroke. This is accomplished by rotating the lifter 100, which is actuated by a motor 40, through its gearbox 42—see FIG. 5.

As rotary-to-linear lifter 100 rotates, at least one of its pins 104, 106, or 108 will come into contact with one of the teeth 94 along the left side (as seen in FIG. 6) of the driver 96. This will cause the driver to be "lifted" upward (as seen in FIG. 6). As the lifter 100 rotates, one of the teeth 94 will be in contact with one of the rotating pins 104, 106, 108 throughout a portion of the rotational travel of the lifter, and the "next" pin will then come into contact with the "next" tooth 94 so that the driver 96 continues to be moved upward. This will remain true until the eccentric cam surface 110 comes into play, and since there are no "working" lifter pins protruding along that surface, the driver 96 will not continue to be driven upward while the eccentric cam surface 110 is positioned along the right portion (as seen in FIG. 6) of the rotary-to-linear lifter 100. However, when this occurs, the latch 120, which is spring-loaded, will have its latch catching surface 124 in a proper location to "catch" the closest tooth 94 along the right-hand side (as seen in FIG. 6) of the driver 96, thereby preventing the driver from falling downward for any significant distance. After this occurs, the "next" lifter pin (which will be the pin 104) will then come along and again make contact with one of the teeth 94 along the left-hand side (as seen in FIG. 6) of the driver 96, thereby continuing to lift the driver toward the top (as seen in FIG. 6) of the cylinder.

In this illustrated embodiment, the rotary-to-linear lifter 100 makes two complete rotations to lift the driver 90 from its lower "resting" position to its upper "ready" position. At the end of the second rotation, the parts will be configured as illustrated in FIG. 6. The piston (not shown in FIG. 6) is once again near the top of the cylinder, and the combined volumes of the main storage chamber and displacement volume have now been reduced to a smaller volume, which means their gases are under a greater pressure, since the gas that was above the piston and in the storage chamber was compressed during the lift of the driver. During the lift of the driver, the latch 120 was "engaged" with the driver teeth 94, however, in this embodiment the latch has a smooth surface in one direction that allows the teeth 94 to push the latch out of the way during the upward lift of the driver. This is much like a ratchet-type action, remembering that the latch is spring-loaded so as to act in this manner.

The "last" tooth 126 along the right-hand side (as seen in FIG. 6) of the driver 96 is engaged with the latch catching surface 124, and so latch 120 now prevents the driver from being moved downward (as seen in this view). The third pin 108 is still in contact with the lower-most tooth 94 along the left-hand side (as seen in FIG. 6) of the driver 96, at this point in the rotational travel of the rotary-to-linear lifter 100. There is a sensor which, in the illustrated embodiment, is a limit switch (not shown), that detects the rotational movements of the lifter 100. This sensor detects the rotational position of the fourth pin 114.

When the sensor detects the fourth pin 114 a first time (in this embodiment), the control system turns off the solenoid (not shown), which will then allow the latch 120 to engage the right-hand teeth (in these views) of the lifter 100. Note that the solenoid can also be turned off earlier during the lift, if desired. When sensor detects this pin 114 a second time (in this embodiment), the current to the motor 40 is turned off, and the motor thus is de-energized and stops the lifting action of the driver 96. Later in the operating cycle, the solenoid acts as a latch actuator.

Due to the gas pressure above the piston, the driver/piston subassembly will drift downward (in these views) a small distance until the tooth 126 contacts the latch surface 124. This is the position illustrated in FIG. 6 of these components, and this configuration is considered to be the "rest" position of the tool. (It is also the "ready" position of the driver.) Although the gas pressure in the combined main storage chamber and displacement volume is near its maximum, the latch 120 prevents the driver from being moved further downward, so the piston is essentially locked in this position until something else occurs.

When it is time to drive a fastener, the next action in the embodiment of FIG. 6 is to cause the motor 40 to become energized once again. This occurs by two independent actions by the user: the safety contact element of the nose 7 (see FIG. 5) must be pressed against a solid surface, and the trigger actuator 9 must be actuated. When both of these actions properly occur, current is delivered to the motor 40 which will once again turn the rotary-to-linear lifter 100. Also, the controller will energize the solenoid, which will rotate the latch 120 a small angular distance to disengage the latch catching surface 124 from one of the teeth 94 of the driver 96. More specifically, this would be the "last" tooth 126.

It should be noted that the rotary motion of the lifter 100 will cause a small upward movement of the driver 96 so that the latch 120 can easily disengage from the "last" tooth 126 of the driver 96. Thus, there will not be a binding action that might otherwise cause the mechanism to jam.

Now that all this has occurred, the latch 120 is in its disengaged position so that its catching surface 124 will not interfere with any of the teeth 94 along the right-hand side (as seen in FIG. 6) of the driver 96; also the eccentric cam surface 110 is now facing the teeth 94 along the left-hand side (as seen in FIG. 6) of the driver 96, and none of the three "working" pins of the lifter will interfere with those left-hand teeth 94. Once the driver tooth "drops off" the last lifting pin 108, the driver 96 is quickly thrust downward in a linear stroke, due to the high gas pressure within the main storage chamber and displacement volume. (This is the "gas spring" effect.) Along the way, the driver 96 will pick up a fastener that is waiting at a feeder carriage (not shown), and drive that fastener to the exit area at the bottom (at the area 7 on FIG. 5). After this action has occurred, the driver 96 will be situated at a lower position in the driver track.

As the driver 90 is being moved downward, the piston 20-22 forces air out of the cylinder venting chamber 42 that is below the piston—see FIG. 1. This volume of air is moved through a vent to atmosphere, and it is desired that this be a low resistance passageway, so as to not further impede the movement of the piston and driver during their downward stroke. The gas above the piston is not vented to atmosphere, but instead remains within the displacement volume 40, which is also in fluidic communication with the main storage chamber 30 (through the end cap 50).

Note that some of the embodiments illustrated herein do not have all of their components included on some of the figures herein, for purposes of clarity. To see examples of such outer housings and other components, especially for earlier designs, the reader is directed to other U.S. patents and applications owned by Senco. Similarly, information about "how" the electronic controller operates to control the functions of the tool is found in other U.S. patents and applications owned by Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, and 8,763,874; also published U.S. patent application No. 2016/0288305 and published U.S. patent application, No. 2018/0178361. These documents are incorporated by reference herein, in their entirety.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A fastener driving tool, comprising:

a working cylinder that includes a movable piston having a reciprocating direction of movement within the cylinder, said cylinder including a variable displacement volume on a first side of said piston, and said cylinder including a variable venting volume on a second, opposite side of said piston;

a storage chamber;

an end cap that is attached to at least one of said cylinder and said storage chamber at an end portion of said fastener driving tool, said end cap including at least one first gas passageway that is in fluidic communication with said cylinder and with said storage chamber;

a movable driver that is in mechanical communication with said piston;

a guide body that guides movements of said driver; and a fill valve subassembly that is mounted at a side portion of said end cap, the fill valve subassembly including a fill valve that is partially enclosed by a fill valve pocket that contains the fill valve, the fill valve pocket being positioned at a sufficient distance from a centerline of the working cylinder so that it entirely clears the working cylinder even though the fill valve pocket is positioned in a direction that is parallel to the direction of movement of the movable piston, said end cap including a second gas passageway that travels between an inner end of the fill valve and said at least one first gas passageway of the end cap;

wherein:

the fill valve is accessible from an angle that is directly above the end cap;

said variable displacement volume of the cylinder, said storage chamber, and said at least one first gas passageway of the end cap all contain pressurized gases when said fastener driving tool is in use; and said pressurized gases are not vented to atmosphere after a drive stroke, but instead said pressurized gases are re-used for a plurality of operating cycles.

2. The fastener driving tool of claim 1, wherein said storage chamber is in fluidic communication at all times with said cylinder, through said end cap.

3. The fastener driving tool of claim 1, wherein said end cap is removable from said storage chamber.

4. The fastener driving tool of claim 1, wherein said fill valve comprises a Schrader valve.

5. The fastener driving tool of claim 1, wherein said guide body receives a fastener to be driven by said driver toward an exit portion of the guide body.

6. The fastener driving tool of claim 5, wherein: said end portion of said fastener driving tool is located at an opposite end from said exit portion of the guide body.

7. The fastener driving tool of claim 1, wherein said side portion of the end cap where the fill valve mounts is outside a boundary of an imaginary cylinder that extends through and beyond said working cylinder.

8. The fastener driving tool of claim 1, wherein: the fill valve is positioned at a sufficient distance from a centerline of the working cylinder that it entirely clears the working cylinder.

9. The fastener driving tool of claim 8, wherein: the fill valve is located in the end cap at the six o'clock position, which is entirely clear from a plurality of mounting fasteners that are positioned at the 1:30, 4:30, 7:30, and 10:30 o'clock positions in the end cap.

10. A fastener driving tool, comprising:

a working cylinder that includes a movable piston having a reciprocating direction of movement within the cylinder, said cylinder including a variable displacement volume on a first side of said piston, and said cylinder including a variable venting volume on a second, opposite side of said piston;

a storage chamber;

an end cap that is attached to at least one of said cylinder and said storage chamber at an end portion of said fastener driving tool, said end cap including at least one first gas passageway that is in fluidic communication with said cylinder and with said storage chamber;

a movable driver that is in mechanical communication with said piston;

a guide body that guides movements of said driver; and a fill valve subassembly that is mounted at a side portion of said end cap, the fill valve subassembly including a fill valve that is partially enclosed by a fill valve pocket that contains the fill valve, the fill valve pocket being positioned at a sufficient distance from a centerline of the working cylinder so that it entirely clears the working cylinder even though the fill valve pocket is positioned in a direction that is parallel to the direction of movement of the movable piston, said end cap including a second gas passageway that travels between an inner end of the fill valve and said at least one first gas passageway of the end cap;

wherein:

the end cap is positioned at the very distal end from the guide body of the fastener driving tool such that an outer end of said fill valve is directly accessible from an angle that is directly above the end cap;

said variable displacement volume of the cylinder, said storage chamber, and said at least one first gas passageway of the end cap all contain pressurized gases when said fastener driving tool is in use; and said pressurized gases are not vented to atmosphere after a drive stroke, but instead said pressurized gases are re-used for a plurality of operating cycles.

11. The fastener driving tool of claim 10, further comprising a fill valve cover that protects said outer end of the fill valve during use of said fastener driving tool, yet said fill valve cover is directly accessible.

* * * * *